United States Patent
Chan et al.

(10) Patent No.: US 6,556,395 B1
(45) Date of Patent: Apr. 29, 2003

(54) GROUND FAULT CIRCUIT INTERRUPTER FOR CIRCUITS OPERATING WITH NON-SINUSOIDAL WAVEFORMS

(75) Inventors: David Y. Chan, Bellerose, NY (US); Roger M. Bradley, North Bellmore, NY (US); Frantz Germain, Rosedale, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 231 days.

(21) Appl. No.: 09/610,765

(22) Filed: Jul. 6, 2000

Related U.S. Application Data
(60) Provisional application No. 60/142,717, filed on Jul. 7, 1999.

(51) Int. Cl.[7] .............................. H02H 3/00; H02H 3/16
(52) U.S. Cl. ............................. 361/42; 361/50; 361/45; 361/93.1
(58) Field of Search .......................... 361/42, 45, 93.1, 361/49, 50, 115

(56) References Cited

U.S. PATENT DOCUMENTS

| | | | | |
|---|---|---|---|---|
| 5,786,971 A | * | 7/1998 | Chan et al. .................. | 361/115 |
| 5,793,587 A | * | 8/1998 | Boteler ........................ | 361/42 |
| 5,825,599 A | * | 10/1998 | Rosenbaum ................. | 340/651 |
| 5,841,615 A | * | 11/1998 | Gershen ...................... | 361/118 |
| 5,917,686 A | * | 6/1999 | Chan et al. ................... | 361/42 |
| 5,963,406 A | * | 10/1999 | Neiger et al. ................. | 361/42 |
| 6,088,205 A | * | 7/2000 | Neiger et al. ................. | 361/42 |
| 6,111,733 A | * | 8/2000 | Neiger et al. ............... | 361/115 |
| 6,128,169 A | * | 10/2000 | Neiger et al. ............... | 324/520 |

* cited by examiner

Primary Examiner—Bao Q. Vu
(74) Attorney, Agent, or Firm—Paul J. Sutton

(57) ABSTRACT

A device for providing ground fault protection for one or more loads in an electrical wiring system. The device includes a pickup for sensing electrical characteristics associated with conductors supplying power to the one or more loads and generating a pick up signal when predefined electrical characteristics are sensed; a ground fault detector powered using conductors that are independent of the conductors supplying power to the one or more loads, said ground fault detector being configured to receive said pickup signal, detect ground faults from said pickup signal, and generate a trigger signal when a ground fault is detected, and a power disconnect responsive to said trigger signal such that when said trigger signal is generated power to the one or more loads is disconnected. A corresponding method is also provided.

17 Claims, 6 Drawing Sheets

GROUND FAULT CIRCUIT INTERRUPTER FOR CIRCUITS OPERATING WITH NON-SINUSOIDAL WAVEFORMS

This application claims priority pursuant to 35 U.S.C. 119(e) from provisional application number 60/142,717, filed on Jul. 7, 1999.

BACKGROUND

1. Field

The present application relates to ground fault circuit interrupters that provide ground fault protection for dimmer controlled wiring systems. More particularly, the present application relates to ground fault circuit interrupters that provide ground fault protection for one or more loads in an electrical wiring system when a current waveform to the loads is non-sinusoidal.

2. Description of the Related Art

Electrical wiring systems are typically included in residential, commercial and industrial environments where electrical power is supplied to various components in the system. Generally, such electrical wiring systems include phase and neutral (or return) conductors, which when properly connected, supply electrical power to the various components, e.g., loads, in the system.

In such electrical wiring systems certain current safety codes require the installation of circuit protection devices that trip when certain electrical based faults occur. One example of such a circuit protection device is a ground fault circuit interrupter (GFCI) that is responsive to the detection of ground faults.

Conventional ground fault circuit interrupters typically use a sense transformer, such as a differential transformer, to sense a difference current in the phase and neutral conductors that pass through the transformer. The difference current is transferred to a secondary winding of the differential transformer. Typically, the current at the secondary winding, known as the secondary current, is proportional to the difference current. Conventional GFCI devices also use a ground/neutral transformer to detect ground to neutral faults.

Generally, when detecting ground faults from a difference current, a sense amplifier converts the secondary current to a voltage level. This voltage level is compared to two window detector reference voltages, and if one of the compared voltages exceeds a designed threshold for a predetermined period of time, a trigger signal, representing a difference current ground fault, is generated. Generally, when detecting ground to neutral faults, the ground/neutral and sense transformers are coupled through external resistors and capacitors and a neutral wire ground loop, to form a positive feedback loop around the sense amplifier. The feedback loop causes the sense amplifier to oscillate at a frequency determined by the inductance of the secondary winding of the ground/neutral transformer and a capacitor. Typically, oscillation occurs at 8 KHz. If the amplifier oscillates for predefined period of time, the trigger signal, representing a ground to neutral fault, is generated.

The trigger signal is as a control of a gate of an SCR. When the trigger signal is present, the SCR is turned on and a relay solenoid is energized to open contacts between a line side and a load side of the GFCI device to cut off power supplied to the load side of the device.

Current GFCI devices are required in certain branch circuits in electrical wiring systems, such as bathrooms, kitchens and certain outdoor environments. Such branch circuits are typically supplied with AC power that has a continuous sinusoidal waveform so that conventional GFCI devices, which are designed to sense RMS or average ground fault currents, are capable of providing ground fault protection.

However, in other environments, such as theaters, movie sets and other entertainment settings or stages, designers are asked to develop electrical wiring systems which are more theatrical in nature, in environments where ground fault protection is desired. One such theatrical feature is to dim certain lighting fixtures in wet environments. In such systems, phase controlled dimmer devices are used to limit current supplied to the loads. The current supplied to such loads is also identified herein as phase dimmed current. In such electrical wiring systems where the AC current supplied to certain loads is phased dimmed, the waveform of the AC current supplied to the loads may no longer be sinusoidal. In the event the phase dimmed current is non-sinusoidal, conventional GFCI devices may become desensitized, so that their use in such electrical wiring systems is not recommended.

SUMMARY

The present application provides a ground fault protected phase controlled dimmer system, and a GFCI device that can be used in such phase controlled dimmer systems.

BRIEF DESCRIPTION OF THE DRAWINGS

Preferred embodiments of the present application are described herein with reference to the drawings in which similar elements are given similar reference characters, wherein.

DETAILED DESCRIPTION

Generally, the present application describes exemplary embodiments of a ground fault protected phase controlled dimmer system and a ground fault circuit-interruption device capable of being used in such dimmer systems. As with conventional ground fault circuit interrupting devices, the faults detected from difference current and ground to neutral faults are both encompassed in the term ground fault.

The dimmer systems may be used in various environments where it is desirable to control the AC supplied to one or more loads with a dimming device that outputs a phase dimmed current that is non-sinusoidal. The various environments include, for example, theaters, movie sets and other entertainment settings or stages. An example of a ground fault protected dimmer system that can be used in such environments is shown in FIGS. 1 and 2.

Figure 1:
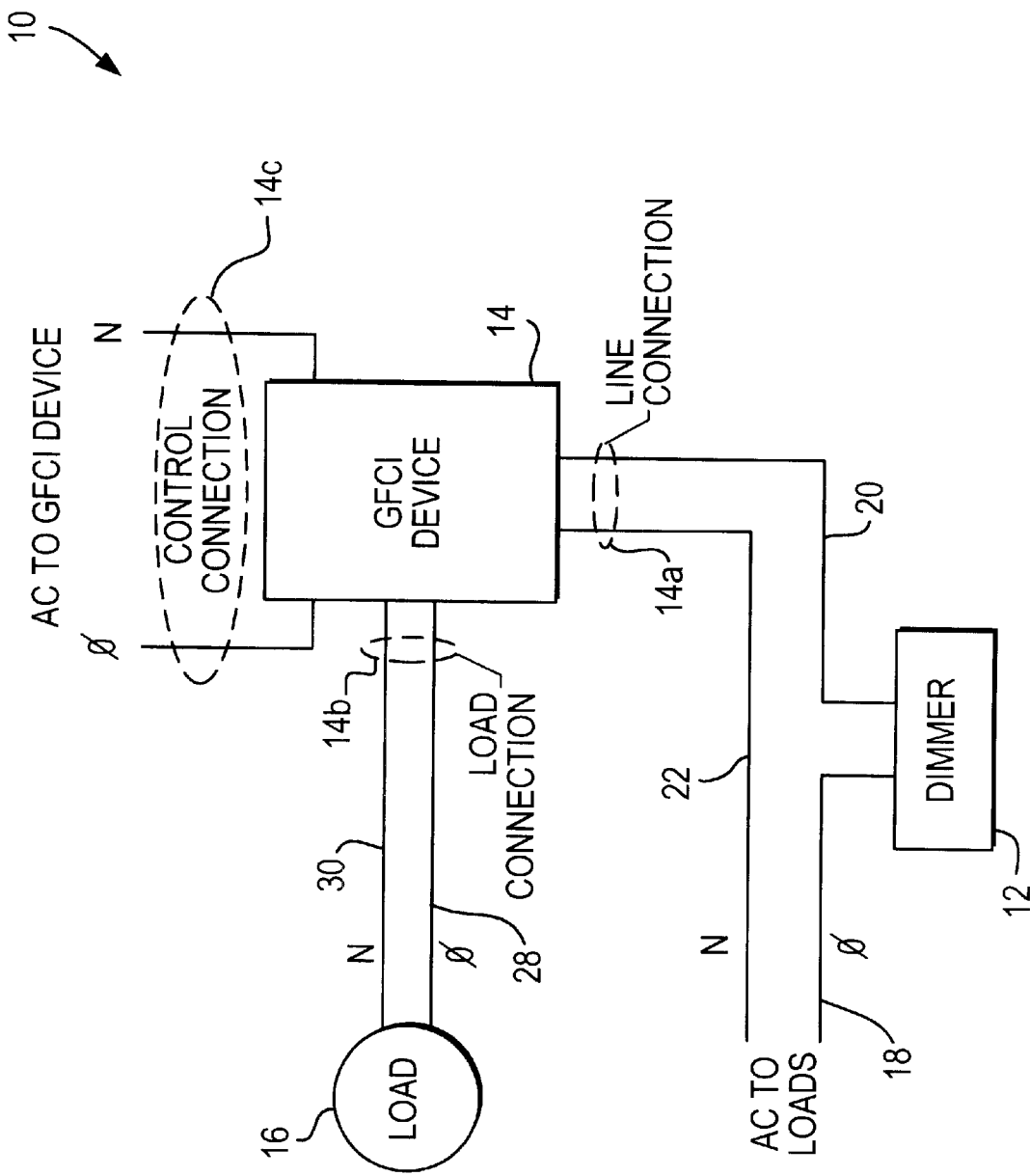
FIG. 1 is an exemplary system block diagram for a ground fault protected phase controlled dimmer system according to the present application.

In FIG. 1, the ground fault protected phase controlled dimmer system 10 includes a dimmer device 12, a GFCI device 14 and one or more loads 16. In the configuration of FIG. 1, the phase input of the dimmer device 12 is connected to the phase conductor 18 of the AC supply and the output of the dimmer device 12 is electrically connected to the line side connection 14a of the GFCI device 14 via conductor 20. The conductor 20 between the dimmer device 12 and the GFCI device carries the phase dimmed current. A corresponding neutral conductor 22 from the AC supply is also connected to the line side connection 14a of the GFCI device 14. Conductors 28 and 30 connect the load side connection 14b to the one or more loads 16.

As described, the GFCI device 14 generally has a line side connection 14a with phase and neutral connections, such as binding terminals, wire leads or other known connections capable of connection to electrical conductors. The line side connection connects the GFCI device 14 to the dimmer device. The GFCI device has a load side connection 14b with phase and neutral connections, such as binding terminals, wire leads or other known connections capable of connection to electrical conductors. The load side connection connects the GFCI device to the one or more loads. The GFCI device 14 also includes a control connection 14c with phase and neutral connections, such as binding terminals, wire leads or other known connections capable of connection to electrical conductors. The control connection 14c connects the GFCI device to an AC supply that is independent of the AC supplied to the one or more loads.

Figure 2:
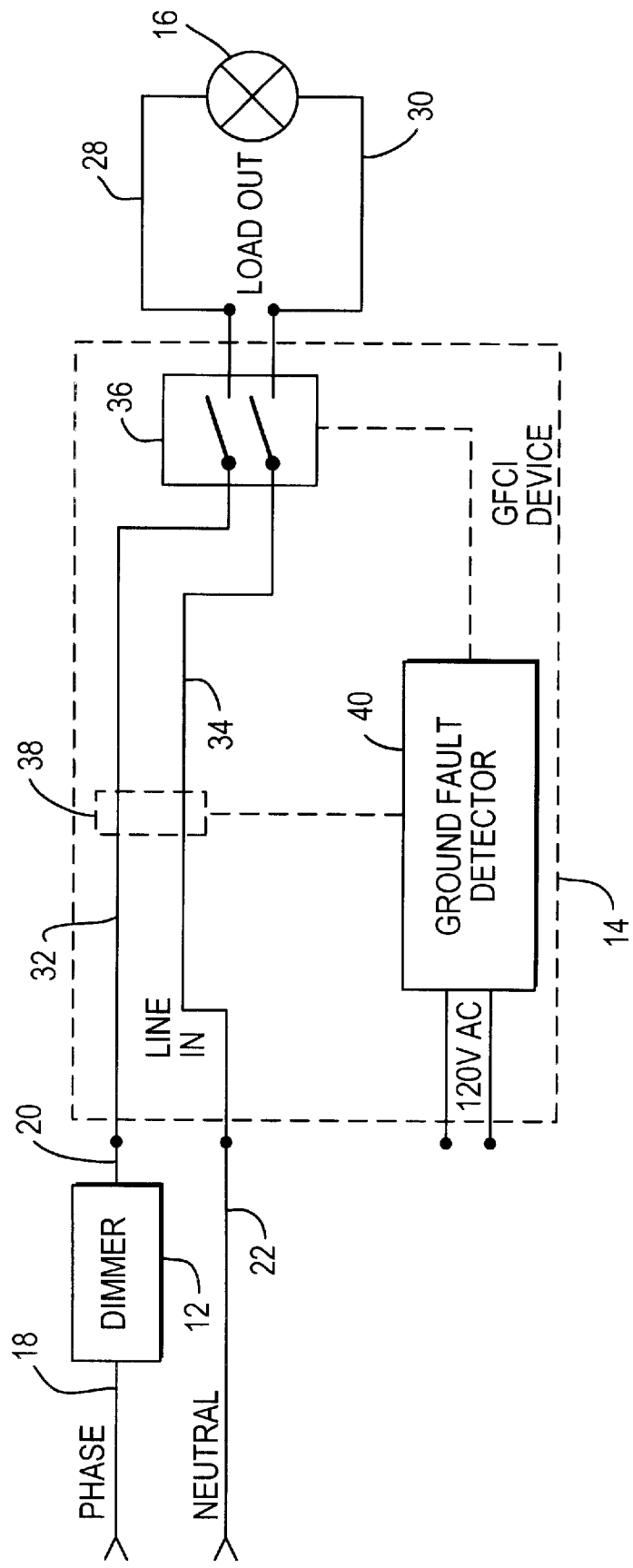
FIG. 2 is a system wiring diagram for the ground fault protected phase controlled dimmer system according to the present application.

Referring to FIG. 2, the GFCI device 14 also includes a conductive path 32 between the line and load phase connections, and a conductive path 34 between the line and load neutral connections. A power disconnect 36 that is capable of opening and closing at least a portion of the conductive path is provided. In the embodiment of FIG. 2, the power disconnect 36 is capable of opening and closing the phase and neutral conductive paths. However, it is also contemplated that the power disconnect 36 can be configured to open one of the phase or neutral conductive paths. Preferably, the power disconnect 36 is a relay capable of switching high currents. Examples of other suitable power disconnects include solid state switches.

The GFCI device 14 also includes a pickup 38 and a ground fault detector 40. The pickup 38 is used to monitor the phase dimmed current associated with the conductive paths for predefined electrical characteristics, and to generate a pickup signal when the predefined current characteristics occur. The ground fault detector 40 is electrically coupled to the pickup device 38 and is used to determine whether the pickup signal includes a ground fault. The AC supply from control connection 14c supplies power to the ground fault detector 40. As seen in FIG. 2, to ensure that the AC power supplied to the ground fault detector 40 is sinusoidal, the AC supply is independent of the phase dimmed current supplied to the loads.

As noted, the pickup 38 generates a pickup signal when predefined electrical (e.g., current) conditions occur. In the exemplary schematic diagram of FIG. 3, the pickup 38 includes a differential transformer T1 and a ground-neutral transformer T2 connected to the ground fault detector 40. In this embodiment, the pickup 38 generates a pickup signal when: 1) there is a difference in current flowing in the phase and neutral conductors of the conductive path passing through the differential transformer T1 (a difference current ground fault); or 2) when there is current flowing from the neutral conductor to ground passing through the ground-neutral transformer T2 (a ground to neutral ground fault). Preferably, the ground fault detector 40 uses a ground fault interrupter integrated circuit U1 (GFI circuit), such as the RV4141 integrated circuit manufactured by Raytheon Semiconductor, that is capable of detecting low level ground fault conditions. Preferably, the GFI circuit U1 has a level of ground fault signal integration that is determined by a capacitor that is external to the GFI circuit.

More particularly, to detect difference current ground faults, the differential transformer T1 picks up differences in the current flowing in the phase and neutral conductive paths 32 and 34 passing through a center of the transformer. Such current differences cause a secondary current to flow in the secondary windings of the differential transformer T1, which is the pickup signal. The pickup signal is input to the GFI circuit U1 which converts the secondary current to a voltage, usually using an operational amplifier, and outputs this voltage as a trigger signal. Preferably, the trigger signal is a pulse. Resistors R6 and R7 are used to set the trip level of the GFI circuit and, thus, the GFCI device 14.

To limit or prevent high frequency noise from affecting the pickup signal input to the GFI circuit U1, a capacitor C9 may be connected to across secondary windings of the differential transformer T1, which in combination with resistor R7 forms an RC filter.

As noted, the pickup signal is usually provided as one input to the GFI circuit. This input is compared to a reference voltage, which is preferably one half the supply voltage for the GFI circuit U1. The reference voltage is generated using zener diodes, typically within the GFI circuit U1, and a capacitor C6 stabilizes the reference voltage if the supply voltage fluctuates.

To ensure that the reference voltage does not change after the supply voltage is applied to the GFI circuit U1, capacitor C6 is preferably set to a value that is smaller than the value of the capacitor C4 across the GFI circuit supply voltage. Preferably, the value of capacitor C4 is large, e.g., about 1 NF or greater, and provides a reservoir for the GFI circuit supply voltage: Capacitor C5, which is in parallel with capacitor C4, is a decoupling capacitor that prevents high frequency noise, in the supply voltage, from affecting the GFI circuit U1.

Ground to neutral ground faults are detected using the grounded neutral transformer T2, and capacitors C7 and C8 form the positive feedback loop as described hereinabove.

As previously described, AC current supplied to the ground fault detector 40 independent of the phase dimmed current supplied to the loads. Ferrite beads FB1 and FB2 provide high frequency filtering for the AC supplied to the ground fault detector 40. Preferably, two LC filters formed by inductors L1 and L2 and capacitor C2 provide further filtering of the AC supplied to the ground fault detector 40. Capacitor C2 in conjunction with resistor R3 act as a snubber. A metal oxide varistor (MOV) MV1 is used to protect the GFCI device 14 from external voltage spikes. The filtered AC is then is then used to power the ground fault detector 40 through a full wave bridge rectifier formed by diodes D1, D2, D3 and D4.

On the DC side of the bridge rectifier, the rectified AC is used as the supply voltage for the GFI circuit U1, through voltage dropping resistor R5. In addition, the supply voltage is used as an input voltage to a driver circuit 42 used to control the power disconnect 36. The supply voltage is dropped through the resistor network created by resistors R1, R2 and R4. The voltage across resistor R1 is used to turn on transistor Q1 when the GFCI device 14 is first powered.

When the transistor Q1 is turned on, the power disconnect 36 is energized (through electrical connections designated by the legends A and B) and the contacts between the line and load in the phase-dimmed circuit are closed. Preferably, a relay coil in the power disconnect is energized. Capacitor C1 is used to attenuate voltage spikes that may be created when the relay coil is energized and de-energized.

Figure 3:
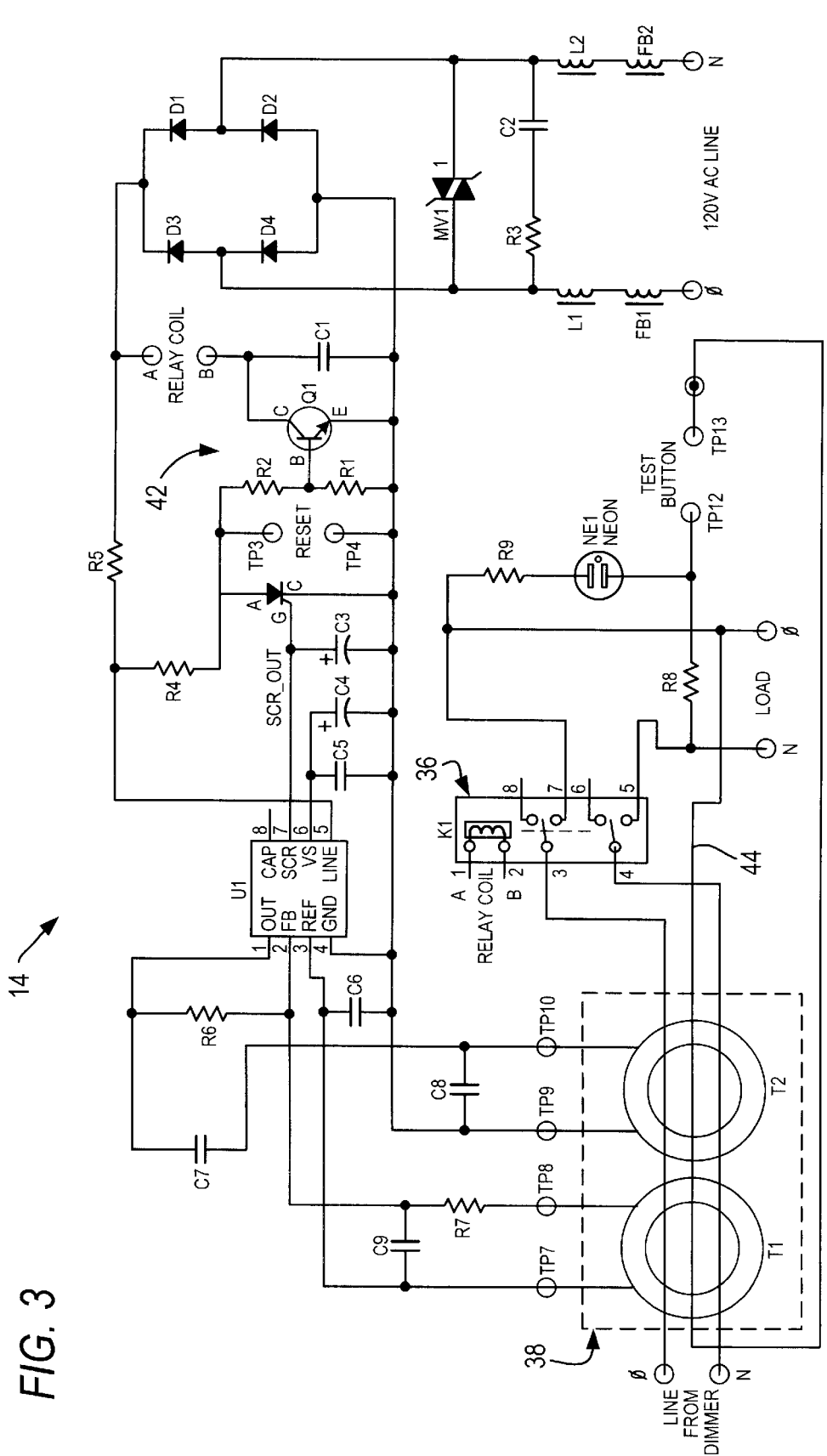
FIG. 3 is a schematic diagram of circuitry capable of detecting ground faults.

In the embodiment of FIG. 3, the driver circuit also includes an SCR (SC1) that turns on the transistor Q1. If a ground fault is detected, the GFI circuit U1 outputs a trigger signal, which is connected to the gate of the SCR to turn on the SCR. Capacitor C3 is used as a filter on the gate of the SCR. When the SCR is turned on, the voltage between resistors R4 and R2 drops down to a diode voltage of the SCR. As a result, the voltage across the base of transistor Q1 drops causing the transistor to turn "off, thus turning" off current flow through the relay coil in the power disconnect 36. With the relay coil de-energized, the contacts open and power is removed from the load on the dimmed circuit. In this way the GFCI device 14 interrupts power to the load when a ground fault is detected.

In the configuration of FIG. 3, the contacts in the power disconnect 36 are in a closed position when the independent AC supply is applied to the GFCI device 14, and the contacts are in an open position when the GFCI device 14 loses power. As a result, if the independent AC power supplying the ground fault detector 40 of the GFCI device 14 is lost, the power disconnect 36 will open so that AC supplied to the one or more loads is disconnected.

The operation of the GFI device will now be described with reference to FIGS. 2 and 3. If the GFI circuit U1 detects a ground fault from the pickup signal, the GFI circuit U1 outputs a trigger signal (e.g., a pulse) to the gate of SCR, thus, turning the SCR "on". When the SCR is turned "on", the power disconnect 36 is energized causing, the conductive paths 32 and 34 to open.

To reset the GFCI device 14, a reset actuator (e.g., a reset pushbutton switch) is activated so that a short is created across the SCR. Since the trigger signal is a pulse, shorting the SCR commutates the current through the SCR, thus, causing the SCR to turn "off". Transistor Q1 then turns "on" so that the power disconnect 36 is energized causing the contacts to close. It is noted. that if a ground fault is still present, the SCR would again be triggered so that the GFCI device 14 trips.

Preferably, the GFCI device 14 includes a test circuit, which tests the operating components of the device. The test circuit includes an actuator (e.g., a test pushbutton switch) and a conductor passing through the differential transformer T1. When the test button is activated, a test current (simulating a ground fault) flows through the conductor 44. The level of the test current is determined by resistor R8, which, in this embodiment, generates a test current of about 8.3 mA (rms) that is capable of testing the GFCI device 14 with the dimmer device 12 set at half brightness or greater. Alternatively, the resistor R8 can be set to a value that produces a peak current that is greater than 8.3 mA at a predefined phase angle. In such instances, a test current can be used to test the GFCI device 14 with the dimmer device 12 set to the predefined phase angle.

Referring again to FIG. 3, the GFCI device 14 can be provided with an indicator which when activated identifies a predefined condition. The indicator may be a neon light NE1, which in combination with current limiting resistor R9 can be used to indicate power is supplied to the one or more loads 16. However, the indicator can be used to indicate a variety of events. For example, if indication of relay position is desired, the neon light NE1 and resistor R9 can be placed in parallel with the relay coil of the power disconnect 36 so that the neon light will be "on" when the relay coil is turned "on", and the neon light will be "off" when the relay coil is turned "off".

Figure 4:
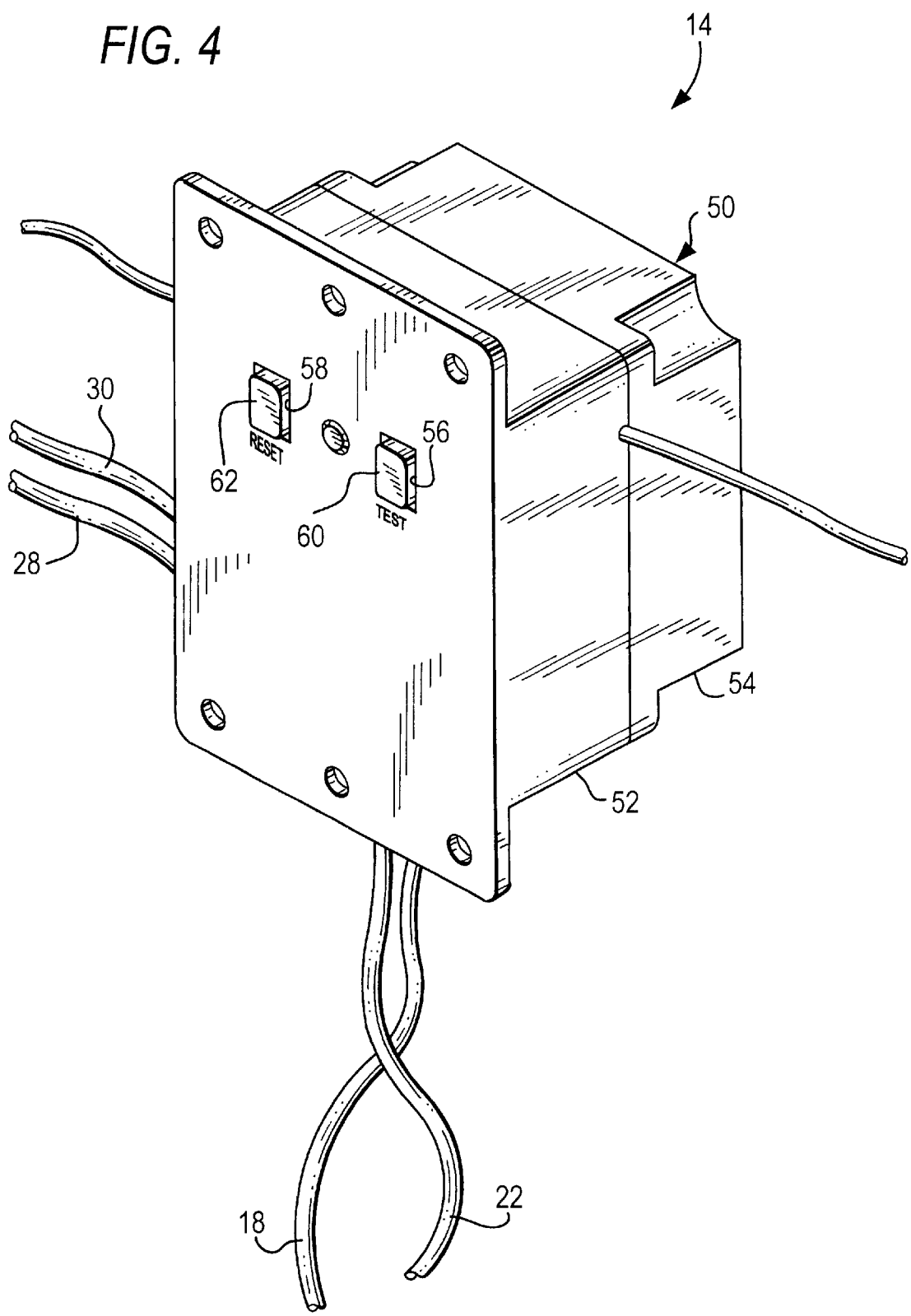
FIG. 4 is a perspective view of a GFCI device capable of providing ground fault protection in the phase controlled dimmer system.

Referring now to FIG. 4, the power disconnect 36, ground fault detector 40 and pickup 38 are preferably enclosed in a housing 50 for installation in an electrical wiring system. The housing 50 can be configured and dimensioned to fit within a single gang recessed junction box commonly used in electrical wiring systems. However, the housing can also be configured to fit within a multiple gang recessed junction box, or as a stand alone wall mountable unit capable of being used in either interior or exterior environments.

Figure 5:
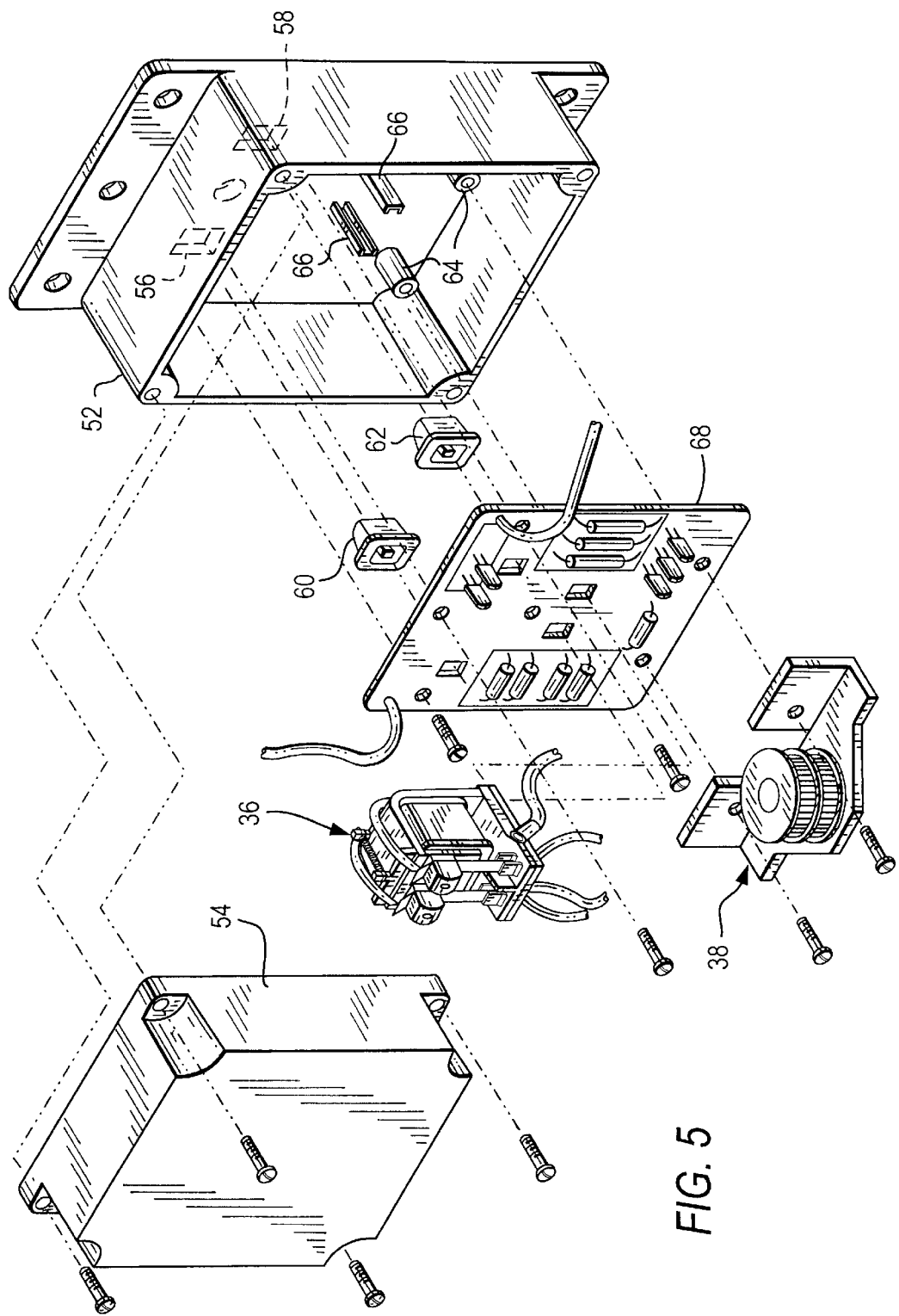
FIG. 5 is a perspective view, with parts separated, of the GFCI device of FIG. 4.

In the embodiment of FIG. 4, the housing 50 is a two-part housing configured for installation in a single gang recessed junction box. The two-part housing includes a front cover 52 and a rear cover 54, which permit easy assembly of the GFCI device 14. As seen in FIGS. 4 and 5, the front cover 52 includes a pair of openings 56 and 58 through which test and reset actuators 60 and 62 extend. The front cover 52 also includes a plurality of circuit board mounts 64 for securing circuit board 68 to the front cover 52. In this embodiment, the ground fault detector 40 and pickup 38 are located on the circuit board 68, and the test and reset actuators 60 and 62 interact with or form part of the test and reset switches on the circuit board. The power disconnect 36 is secured to mounting arms 66 on front cover 52 and is positioned adjacent the circuit board 68. The rear cover 54 is secured to the front cover to enclose the ground fault detector 40, power disconnect 36 and the pickup 38.

Figure 6:
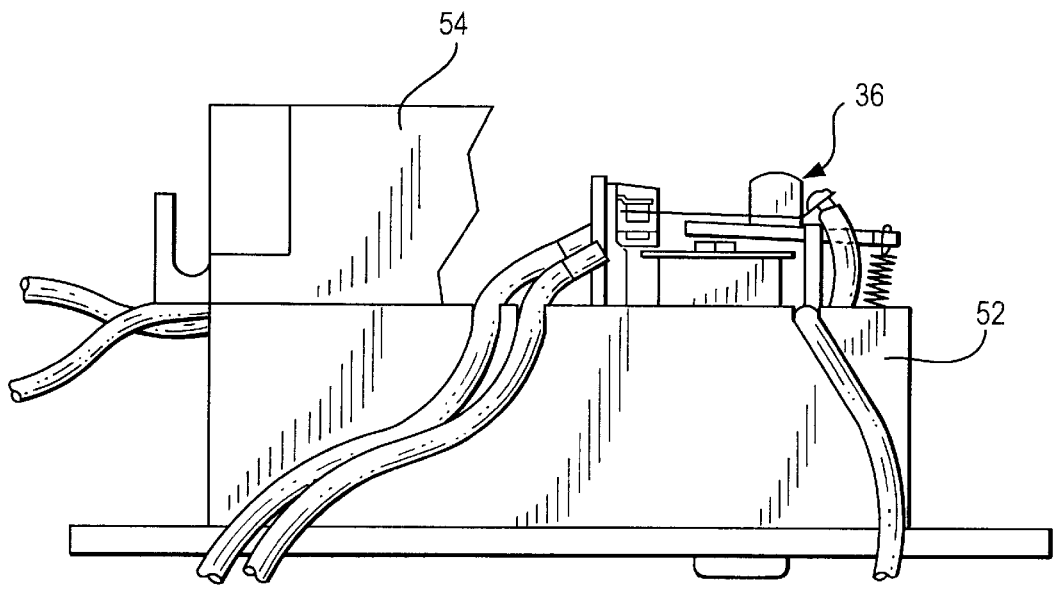
FIG. 6 is a side elevational view of the GFCI device of FIG. 4 with a portion of the device housing removed to illustrate a mechanism for opening and closing at least one conductive path; which is in an open position.
Figure 7:
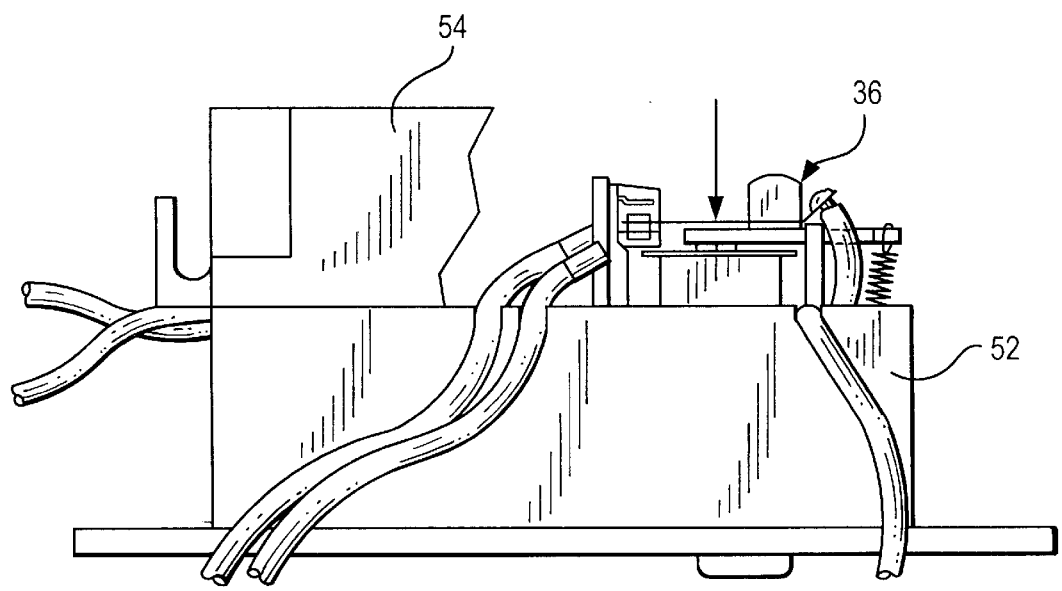
FIG. 7 is a side elevational view similar to FIG. 6, illustrating the mechanism for opening and closing the at least one conductive path in a closed position.

Finally, referring to FIG. 6, a side elevational view of the GFCI device of FIG. 4 with a portion of the rear cover 54 removed illustrates the power disconnect 36 in the open position. Likewise, referring to FIG. 7, a side elevational view of the GFCI device of FIG. 4 with a portion of the rear cover 54 removed illustrates the power disconnect 36 in the closed position.

It will be understood that various modifications can be made to the embodiments of the present invention herein without departing from the spirit and scope thereof. Therefore, the above description should not be construed as limiting the invention, but merely as preferred embodiments thereof. Those skilled in the art will envision other modifications within the scope and spirit of the invention as defined by the claims appended hereto.

What is claimed is:

1. A device for providing ground fault protection for one or more loads in an electrical wiring system, comprising:

a pickup for sensing electrical characteristics associated with conductors supplying power to the one or more loads and generating a pick up signal when predefined electrical characteristics are sensed;

a ground fault detector powered using conductors that are independent of the conductors supplying power to the one or more loads, said ground fault detector being configured to receive said pickup signal, detect ground faults from said pickup signal, and generate a trigger signal when a ground fault is detected, and a power disconnect responsive to said trigger signal such that when said trigger signal is generated power to the one or more loads is disconnected.

2. The device according to claim 1 further comprising a housing configured for installation in the electrical wiring system, wherein said pickup, said ground fault detector and said power disconnect are located in said housing.

3. The device according to claim 2, wherein said housing is configured and dimensioned for installation in a single gang junction box in the electrical wiring system.

4. The device according to claim 1, wherein said pickup comprises a transformer capable of sensing current differences between phase and neutral conductors supplying power to the one or more loads.

5. The device according to claim 1, wherein said pickup comprises a ground-neutral transformer capable of sensing ground to neutral faults associated with the phase and neutral conductors supplying power to the one or more loads.

6. The device according to claim 1, wherein said power disconnect comprises a relay.

7. The device according to claim 1, wherein said power disconnect comprises a solid state switch.

8. A device for providing ground fault protection for a load controlled by a phase controlled dimmer device, comprising:

line side phase and neutral connections connectable to the phase controlled dimmer device;

load side phase connection connectable to the load;

control phase and neutral connections;

a phase conductive path between said line side phase connection and said load side phase connection;

a neutral conductive path between said line side neutral connection and said load side neutral connection;

a pickup capable of monitoring current flow through said phase and neutral conductive paths and generating a pickup signal when predefined current characteristics occur;

a ground fault detector supplied power at said control phase and neutral connections, said ground fault detector being capable of detecting ground faults from said pickup signal and generating a trigger signal when a ground fault is detected; and a power disconnect responsive to said trigger signal, such that when said trigger signal is generated said power disconnect opens at least said phase conductive path.

9. The device according to claim 8, wherein said power disconnect opens said phase and neutral conductive paths when said trigger signal is generated.

10. The device according to claim 8, wherein said power disconnect comprises a relay.

11. The device according to claim 8, wherein said power disconnect comprises a solid state switch.

12. The device according to claim 8 further comprising a housing, wherein said pickup, said ground fault detector and said power disconnect are located within said housing.

13. The device according to claim 12, wherein said housing is configured and dimensioned for installation in a junction box in an electrical wiring system.

14. The device according to claim 12, wherein said line side, load side and control phase and neutral connections comprise binding posts on an exterior of said housing.

15. The device according to claim 12, wherein said line side, load side and control phase and neutral connections comprise wire leads extending from said housing.

16. A method for providing ground fault protection for one or more loads in an electrical wiring system, comprising:

sensing electrical characteristics associated with conductors supplying power to the one or more loads and generating a pick up signal when predefined electrical characteristics are sensed;

using conductors that are independent of the conductors supplying power to the one or more loads to power a ground fault detector, said ground fault detector being, configured to receive said pickup signal, detect ground faults from said pickup signal, and generate a trigger signal when a ground fault is detected; and disconnecting the power to the one or more loads using a power disconnect responsive to said trigger signal such that when said trigger signal is generated power to the one or more loads is disconnected.

17. A method for providing ground fault protection for a load controlled by a phase controlled dimmer device, comprising:

providing a line side phase connection and a line side neutral connection connectable to the phase controlled dimmer device;

providing a load side phase connection connectable to the load;

providing a control phase connection and a control neutral connection;

providing a phase conductive path between said line side phase connection and said load side phase connection;

providing a neutral conductive path between said line side neutral connection and said load side neutral connection;

providing a pickup capable of monitoring current flow through said phase and neutral conductive paths and generating a pickup signal when predefined current characteristics occur;

providing a ground fault detector supplied power at said control phase and control neutral connections, said ground fault detector being capable of detecting ground faults from said pickup signal and generating a trigger signal when a ground fault is detected; and providing a power disconnect responsive to said trigger signal, such that when said trigger signal is generated said power disconnect opens at least said phase conductive path.

* * * * *